US009638159B2

(12) United States Patent
Nuebel et al.

(10) Patent No.: US 9,638,159 B2
(45) Date of Patent: May 2, 2017

(54) LASER SPARK PLUG AND COOLER FOR A LASER SPARK PLUG

(75) Inventors: Karl-Heinz Nuebel, Simmozheim (DE); Pascal Woerner, Korntal-Muenchingen (DE); Juergen Raimann, Weil der Stadt (DE); Rene Hartke, Stuttgart (DE); Joerg Engelhardt, Ditzingen (DE); Martin Weinrotter, Vitoria-Gasteiz (ES)

(73) Assignee: ROBERT BOSCH GMBH, Stuttgart (DE)

( * ) Notice: Subject to any disclaimer, the term of this patent is extended or adjusted under 35 U.S.C. 154(b) by 387 days.

(21) Appl. No.: 14/233,115

(22) PCT Filed: Jun. 1, 2012

(86) PCT No.: PCT/EP2012/060342
§ 371 (c)(1),
(2), (4) Date: Apr. 22, 2014

(87) PCT Pub. No.: WO2013/010704
PCT Pub. Date: Jan. 24, 2013

(65) Prior Publication Data
US 2014/0216383 A1 Aug. 7, 2014

(30) Foreign Application Priority Data
Jul. 20, 2011 (DE) .................. 10 2011 079 507

(51) Int. Cl.
*F02P 23/04* (2006.01)
*F01P 3/16* (2006.01)
*H01S 3/04* (2006.01)

(52) U.S. Cl.
CPC .............. *F02P 23/045* (2013.01); *F01P 3/16* (2013.01); *F02P 23/04* (2013.01); *H01S 3/0407* (2013.01)

(58) Field of Classification Search
CPC .. F02P 23/045; F02P 23/04; F01P 3/16; H01S 3/0407
See application file for complete search history.

(56) References Cited

U.S. PATENT DOCUMENTS 4,944,262 A * 7/1990 Molina ................ F01L 7/10
123/151
6,382,957 B1 * 5/2002 Early .................. F02P 23/04
123/143 B
(Continued)

FOREIGN PATENT DOCUMENTS

DE            35 27 643         9/1986
DE       10 2009 000487         8/2010
(Continued)

OTHER PUBLICATIONS

International Search Report for PCT/EP2012/060342, dated Oct. 9, 2012.

*Primary Examiner* — Hai Huynh
*Assistant Examiner* — Gonzalo Laguarda
(74) *Attorney, Agent, or Firm* — Gerard Messina

(57) ABSTRACT

A laser spark plug configured to be installed into a plug shaft of an internal combustion engine, and to focus laser ignition energy into the combustion chamber via combustion chamber-side, and thus proximal end, of the laser spark plug has, at a distal end of the laser spark plug opposite to the proximal end, a connecting unit for detachable mechanical and thermal connection to a cooler, the connecting unit being designed to permit the connecting and the disconnecting of the cooler when the laser spark plug is installed in the plug shaft.

9 Claims, 6 Drawing Sheets

(56) References Cited

U.S. PATENT DOCUMENTS

| | | | | |
|---|---|---|---|---|
| 6,785,315 B1* | 8/2004 | Hook | ............... | F41H 13/0062 |
| | | | | 372/109 |
| 2007/0064746 A1* | 3/2007 | Winklhofer | ............ | F02P 23/04 |
| | | | | 372/10 |
| 2012/0118114 A1* | 5/2012 | Weinrotter | ............. | B25B 13/06 |
| | | | | 81/124.2 |
| 2013/0186361 A1* | 7/2013 | Nuebel | ................ | F02P 13/00 |
| | | | | 123/143 B |

FOREIGN PATENT DOCUMENTS

| | | |
|---|---|---|
| EP | 1 519 038 | 3/2005 |
| JP | 2001-140914 | 5/2001 |
| JP | 2006-9585 | 1/2006 |
| JP | 2011-82206 | 4/2011 |
| WO | WO 2010/057904 | 5/2010 |
| WO | WO 2011/041 807 | 4/2011 |
| WO | WO 2011/041805 | 4/2011 |
| WO | WO 2012/022504 | 2/2012 |

\* cited by examiner

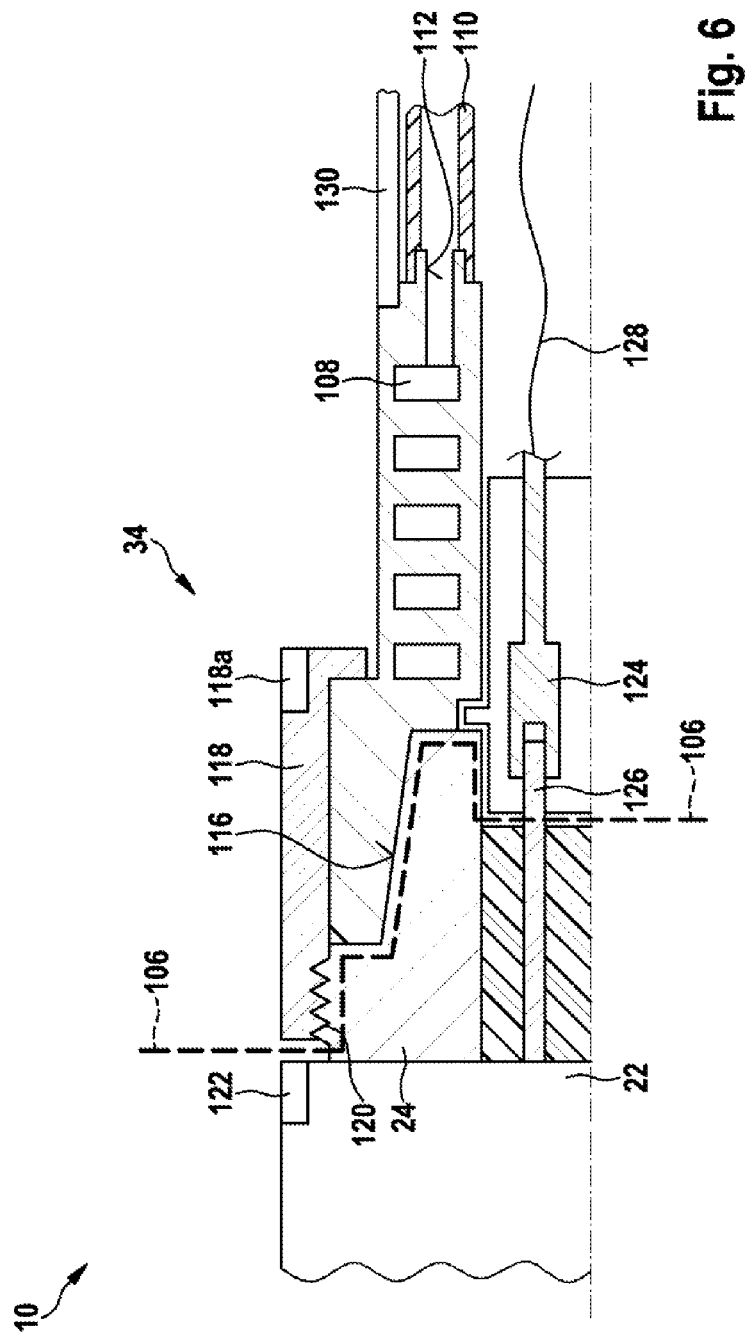

LASER SPARK PLUG AND COOLER FOR A LASER SPARK PLUG

BACKGROUND OF THE INVENTION

1. Field of the Invention

The present invention relates to (i) a laser spark plug equipped to be installed in a plug shaft of an internal combustion engine, (ii) a cooler for such a laser spark plug, and (iii) a laser ignition device.

2. Description of the Related Art

Such a laser spark plug, such a cooler and such a laser ignition device are known in each case from published European patent application document EP 1 519 038 A1. In the subject matter of published European patent application document EP 1 519 038 A1, the actual laser spark plug, which, among other things, has a pumped solid laser as the ignition laser, a pulsed pump light source, a resonator and an output mirror, is integrated together with a cooling device into a single component that is able to be inserted into a plug shaft of the internal combustion engine.

The single component is also designated as laser ignition device in published European patent application document EP 1 519 038 A1. This laser ignition device has a base near the combustion chamber and a headpiece. The headpiece is situated at the end of the laser ignition device, which lies opposite the base, and thus represents the end that is at a distance from the combustion chamber. The direction, in which the headpiece is separated from the base by a distance, defines the direction of the longitudinal axis of the component. In the headpiece, essential components of the laser spark plug are combined, such as the pump source and the ignition laser, with the cooler, which has a Peltier element and elements of a liquid cooler. In this context, the ignition laser is situated centrally near the longitudinal axis of the laser ignition device, the pump sources are situated concentrically about the ignition laser. Cooling channels of the fluid cooler are situated further out at the same height, that is, at about the same distance from the base as the pump source and the ignition laser. The headpiece and the base are connected to each other via an extended and slender tube. The headpiece extends beyond the tube in the radial direction. According to one figure of published European patent application document EP 1 519 038 A1, the headpiece also extends out of the plug shaft in the direction of the longitudinal axis, and in the radial direction it extends beyond the diameter of the plug shaft.

Because of the situation of the laser components in the headpiece, there comes about a large, if not even maximally large distance between the laser components and the output mirror. This is designated in published European patent application document EP 1 519 038 A1 as being an essential feature for achieving a high radiation quality.

BRIEF SUMMARY OF THE INVENTION

According to that, the laser spark plug is distinguished in that, at a distal end opposite the proximal end, it has connecting means for the detachable mechanical and thermal connection to a cooler, the connecting means being equipped to allow connecting and disconnecting the cooler in the case of the laser spark plug built into the plug shaft.

Accordingly, the cooler is distinguished in that it has a proximal end for the detachable mechanical and thermal connection to the laser spark plug, which allows the connecting to take place within the plug shaft of the cooler to the laser spark plug and the disconnecting of the cooler from the laser spark plug.

Accordingly, the laser ignition device is distinguished in that the laser spark plug, at a distal end opposite the proximal end, has connecting means for the detachable mechanical and thermal connection to the cooler, the connecting means being equipped to allow the connecting and disconnecting of the cooler when the laser spark plug is inserted into the plug shaft, and the cooler has a proximal end for the detachable mechanical and thermal connection to the laser spark plug, which allows the connection of the cooler, taking place within the plug shaft, to the laser spark plug and the disconnection of the cooler from the laser spark plug.

In the connected state, the laser spark plug according to the present invention and the cooler according to the present invention form a laser ignition device whose manner of functioning in the built-in state is comparable to the manner of functioning of the known laser ignition device, namely, to provide laser ignition energy and to dissipate interfering heat during operation.

In contrast to the known laser ignition device, the laser components and the cooler are not combined in a single component in the present invention, but are separated from each other into two separable components.

This particularly has the advantage that the laser spark plug, which is to be regarded as a part subject to wear, is able to be exchanged without the cooler having to be changed. Because of that, when observed over longer time periods, operating costs are reduced and resources conserved. In addition, the work cycle in changing the laser spark plug is simplified, since the laser spark plug is able to be changed without opening a liquid cooling circulation. The steps used for opening and closing as well as for ventilating the cooling circulation may be omitted without substitutions, which saves time and thereby also additional costs.

It is also advantageous that, because of the omission of the need for opening the cooling circulation, the danger is reduced of the leakage of cooling means. The running out of cooling means is avoided already during the change of the laser spark plug. It is thereby particularly avoided that cooling means collect in the plug shaft when the cooling circulation is separated, and run into the combustion chamber in response to taking out the laser spark plug, and thereby rinses dirt into the combustion chamber along with it. Thereby, both the danger of so-called water hammer in the subsequent operation of the internal combustion engine as well as increased wear of the internal combustion engine by soiling of the combustion chamber are avoided to some extent.

Because the cooler has a proximal end equipped for mechanical thermal connection to the laser spark plug, a cooler according to the present invention and a laser spark plug according to the present invention may be joined together like a plug and socket pairing to form a laser ignition device, and may also be separated from each other again and then joined together again. That is, we are introducing herewith a laser ignition device, made up in a modular manner, of a laser spark plug module and a cooler module.

Because the distal end of the cooler is equipped to allow an elastic fastening, in the direction of the longitudinal axis of the plug shaft, of the cooler to the internal combustion engine, different thermal expansions of the component in which the plug shaft is located, and the system made up of the laser spark plug and the cooler may be compensated for, without damage occurring by thermomechanical stresses that are too high.

In addition, because of the present invention, there comes about a separation of the laser spark plug components in the longitudinal direction of a laser ignition device having the laser spark plug and the cooler. In particular, this permits a comparatively short design of a laser spark plug.

In one preferred embodiment, the laser spark plug has a laser device having an ignition laser and a pump source, and it has a length at which a distal end of the laser spark plug, in the built-in state, has a distance from a sealing seat in the plug shaft which is less than 230 mm and greater than 80 mm. By contrast, conventional plug shafts of large-bore gas engines have a depth which, in the extreme case, is 230 mm-800 mm, but, as a rule, is between 300 mm and 500 mm. A short design of a laser spark plug, as is made possible by the present invention, and which has a length within the range given, may be situated deep in such a plug shaft, and, even in an extreme case, it does not project beyond the plug shaft. In the case of the values mentioned of an installed length of 80 mm to 200 mm and a plug shaft depth of 300 mm to 500 mm, the installed laser spark plug is therefore located in the lower half, or rather, at least in the lower two-thirds of the plug shaft.

The laser spark plug is held in the plug shaft at its proximal end, for instance, by a screwed connection to the component in which the plug shaft is located. In the combustion engine used as the internal combustion engine, this is the cylinder head, as a rule. This means, in particular, that the laser components and components connected to them of the laser spark plug have a substantially shorter lever to the proximal end near the combustion chamber of the laser spark plug than is the case in the subject matter of EP 1 519 038 A1. As an advantageous result, in the case of vibrations of the combustion engine, correspondingly lower torques occur which have to be compensated for by elastic counteracting forces. The laser spark plug provided here is therefore distinguished by great robustness and vibration resistance.

In contrast to this, in the related art, both laser components and the cooler are located in the headpiece of the only component outside the plug shaft opening. The lever arm, using which inertial forces appearing at the headpiece are able to attack, is correspondingly long. The resistance to vibration diminished thereby is avoided to some extent in the present invention, since the present invention permits a displacement of laser components and cooler components into the depth of the plug shaft.

It is understood that the features mentioned above and still to be explained below may be used not only in the respectively indicated combination, but also in other combinations, or by themselves, without departing from the scope of the present invention.

Exemplary embodiments of the present invention are depicted in the drawings and described in greater detail in the description below. In the various figures, the same reference numerals in each case designate the same elements or elements that are comparable in their functioning.

BRIEF DESCRIPTION OF THE DRAWINGS

FIG. 6 shows an additional exemplary embodiment of a laser ignition device, which is made up of the connecting together of a laser spark plug according to the present invention and a cooler.

DETAILED DESCRIPTION OF THE INVENTION

Figure 1:
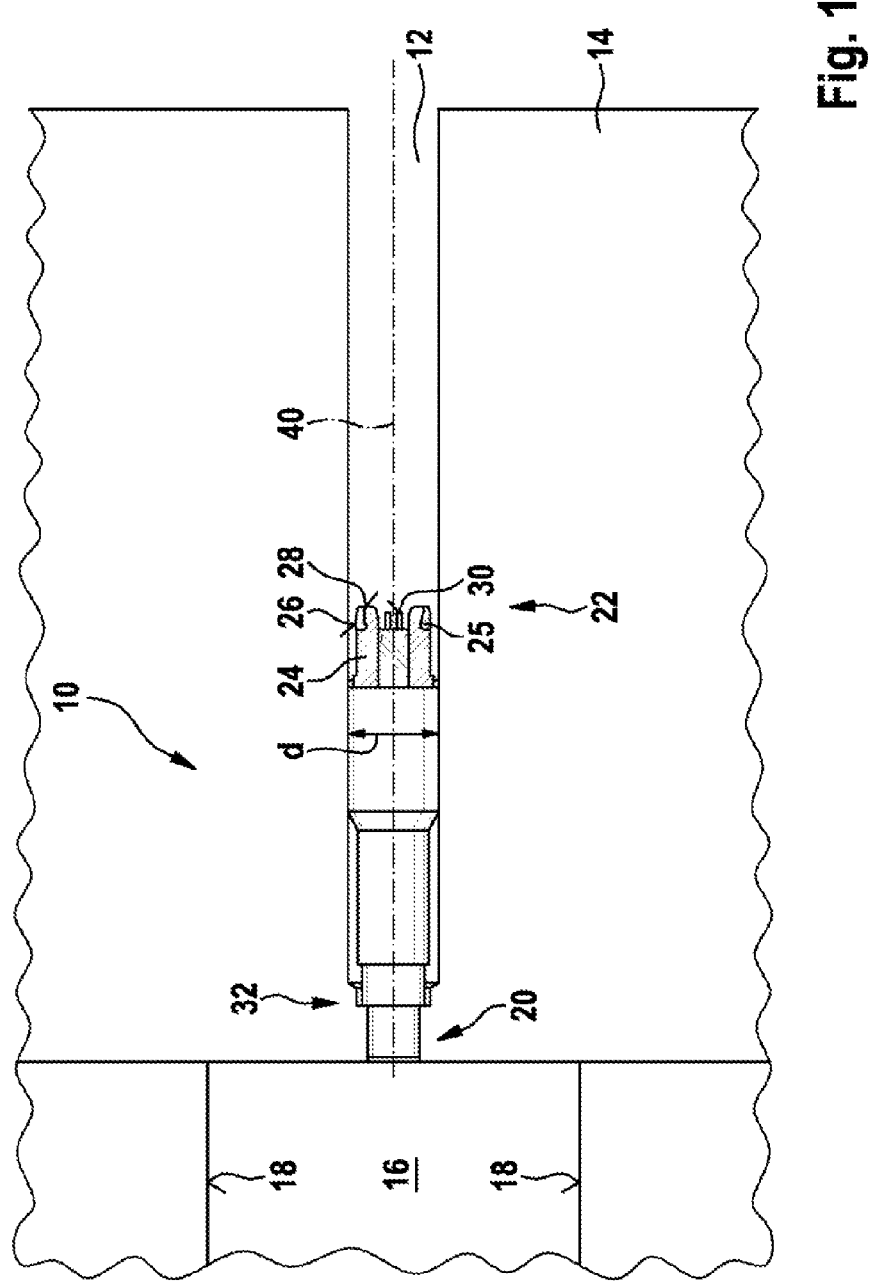
FIG. 1 shows a laser spark plug, which is installed in a plug shaft of an internal combustion engine.

FIG. 1 shows in detail a laser spark plug 10, which is built into a plug shaft 12 of an internal combustion engine. Plug shaft 12 is located, for example, in cylinder head 14 of an internal combustion engine which bounds a combustion chamber 16 of the internal combustion engine. In FIG. 1, such a combustion chamber 16 lies in front of the left opening of plug shaft 12. Further limitations of combustion chamber 16 are yielded by cylinder walls 18 and a piston that seals the combustion chamber in a mobile manner.

Laser spark plug 10 has an end 20 on the combustion chamber side and thus being proximal, and a distal end 22 opposite to proximal end 20. At its proximal end 20, laser spark plug 10 preferably has a thread, using which it is screwed into a tapped hole at the end on the combustion chamber side of plug shaft 12. In this context, laser spark plug 10 is preferably screwed in up to a stop which, in connection with a seal, forms a sealing seat for laser spark plug 10, so that combustion chamber 16 is sealed from plug shaft 12. Laser spark plug 12 is equipped to focus laser ignition energy into combustion chamber 16 via a proximal end 20.

At its distal end 22 lying opposite to proximal end 20, laser spark plug 10 has connecting means 24 for the detachable mechanical and thermal connection to a cooler. Connecting means 24 project at distal end 20 of laser spark plug 10 out from laser spark plug 10 and are implemented, for example, as pins, bolts, sleeves or lugs. Connecting means 24 are preferably made of a metal, particularly a metal having a high thermal conductivity, and have at least one metallic thermal contact surface. A thermal contact surface 26 is preferably situated radially outside on connecting means 24. Alternatively or in addition, a metallic thermal contact surface 28 is situated on the end face of connecting means 24. Furthermore, alternatively or in addition, the thermal contact surface may also be situated radially inside on connecting means 24.

In one preferred embodiment, connecting means 24 are embodied as a catch profile or have at least one catch profile. A hexagonal sleeve is one example of an embodiment in which connecting means 24 are embodied as a catch profile. Another example is an embodiment of connecting means 24 or of parts 25 of connecting means 24 as a claw coupling. Alternatively, the catch profile may be situated as a claw coupling at the distal end of the region having the largest diameter d. The catch profile permits a tightening of a screw joint of laser spark plug 10 with the tapped hole at the proximal end of plug shaft 12, using a tool fitting the respective catch profile.

In addition to connecting means 24, which are used for the detachable mechanical and thermal connection to the cooler, laser spark plug 10, in the embodiment shown in FIG. 1, has connecting means 30, for the detachable electrical connection of laser spark plug 10, which is situated at its distal end 22. These connecting means 30 used for electrical connection are preferably situated at a central location of distal end 22 of laser spark plug 10, and are implemented as a plug element of an electrical plug connection. The plug element may be implemented as a plug or as a socket.

Because of its central situation, connecting means 30, used for the electrical connection, are best protected from damage, which could otherwise occur during the handling of the tool during the course of mounting and/or dismounting laser spark plug 10, for example.

Laser spark plug 10 preferably has the largest diameter d that is smaller than 33 mm, in particular, smaller than 32 mm. Having such a diameter, laser spark plug 10 fits into plug shafts 12 of conventional large-bore gas engines as internal combustion engines (commercial vehicle and passenger car engines have substantially smaller plug shaft diameters), so that laser spark plug 10 is able to be used as a substitute for conventional spark plugs, without this requiring construction changes on cylinder head 14 of the respective combustion engine.

As far as the length of laser spark plug 10 is concerned, a preferred embodiment stands out in that distal end 22 of laser spark plug 10 is at a distance from its sealing seat 32 in plug shaft 12, which is between 80 mm and 230 mm. Conventional plug shafts 12 of large-bore gas engines have a depth of 300 mm to 500 mm, as a rule. Thereby the situation shown qualitatively in FIG. 1 comes about, that installed laser spark plug 10 is situated completely in one-half the depth of plug shaft 12, that is close to the combustion chamber or at least completely in the two-thirds of the depth of plug shaft 12, that is closer to the combustion chamber. As was mentioned before, this yields increased robustness of laser spark plug 10 with respect to vibrations.

Figure 2:
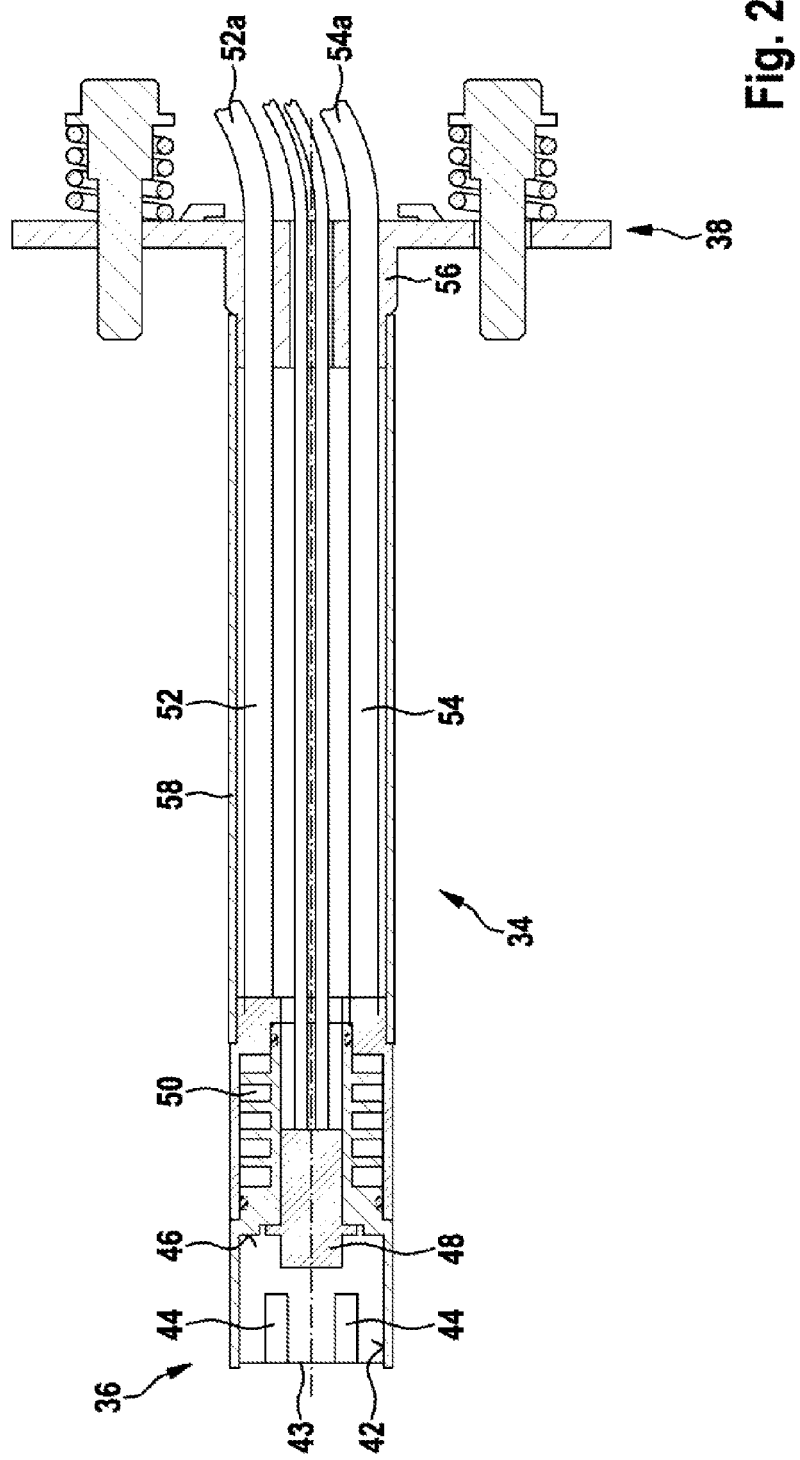
FIG. 2 shows a first exemplary embodiment of a cooler according to the present invention.

FIG. 2 shows a first exemplary embodiment of a cooler 34 according to the present invention. Cooler 34 has a proximal end 36 equipped for mechanical and thermal connection to laser spark plug 12, that is, an end facing combustion chamber 16, and a distal end 38, arranged for fastening to an opening in plug shaft 12. Distal end 38 is arranged to permit an elastic fastening, in the direction of a longitudinal axis 40 of plug shaft 12, of cooler 32 to the internal combustion engine.

For the mechanical and thermal connection, cooler 34 has means, at its proximal end 36, of absorbing heat from laser spark plug 10. These means for absorbing heat are preferably utilized in parallel to the utilization as thermal connection means for the mechanical connection to laser spark plug 10. Because of this multiple utilization, the number of structures required altogether for the thermal connection and the mechanical connection is reduced.

The means for absorbing heat from laser spark plug 10 have at least one heat contact surface 42, which is equipped, by its position and its shape, that is, in the final analysis, by its geometry, to lie against a complementary heat contact surface 26 of laser spark plug 10, in a thermal contact.

In one preferred embodiment, heat contact surface 42 of cooler 34 is a metallic inner surface of a sleeve 43, which is ready to form a press fit with complementary heat contact surface 26 of laser spark plug 10. Such a press fit generates an intimate contact of the heat contact surfaces, and with that, particularly a good thermal contact between heat contact surface 26 of laser spark plug 10 and heat contact surface 42 of cooler 34. In one embodiment, heat contact surface 42 of cooler 34 has one or more slits 44. The parts of sleeve 43 lying between slits 44 thereby become springy tongues, which are elastically deflectable.

Because of this, both a connection and disconnection and also a contact pressure generated by elastic restoring forces is generated in the connected state.

In a further embodiment, alternatively or in supplement to a heat contact surface 42 implemented as a metallic inner surface of a sleeve 43, cooler 34 has a surface of a lug as heat contact surface. In this context, the lug is dimensioned in such a way that it forms a loose fit or a press fit with a corresponding recess or sleeve at distal end 22 of laser spark plug 10. In the case of a loose fit, in particular, it is advantageous to increase in size a thermal contact between the inner surface of the recess or sleeve at distal end 22 acting as the heat contact surface of laser spark plug 10 and the surface of the lug at proximal end 36 of cooler 34 by a heat-conducting paste applied onto at least one of the surfaces.

Alternatively or in supplement to the heat contact surfaces already mentioned, a further embodiment provides end face heat contact surfaces 46 of cooler 34, which come into thermal contact with end face heat contact surfaces 28 of laser spark plug 10 when connected to laser spark plug 10.

The embodiment of a cooler 34 shown in FIG. 2 is particularly equipped to be connected to the embodiment of a laser spark plug 10 shown in FIG. 1. For this purpose, cooler 34 has a centrally situated plug element 48, which is implemented complementarily to plug element 30 of laser spark plug 10, either as a plug or as a socket, in order to produce an electrical connection to laser spark plug 10. Via this electrical connection, a pump source integrated into laser spark plug 10 is controlled and supplied with electrical energy. In addition, check-back signals for the operation of the laser, such as a photodiode signal, are transmitted via this connection. Moreover, a Peltier element may be operated via this electrical connection, that is used, if necessary, in laser spark plug 10 for cooling the pump source. However, in this design, a Peltier element is no longer absolutely necessary.

In order to dissipate the heat transmitted to cooler 34 from laser spark plug 10 in the connected state, the embodiment of cooler 34 shown in FIG. 2 has a liquid-cooled heat exchanger 50. Heat exchanger 50 is in thermal contact with heat contact surfaces 42, 46 of cooler 34. In one preferred embodiment, heat contact surfaces 42, 46 of the heat exchanger form a part of its surface, so that the heat absorbed via heat contact surfaces 42, 46 is dissipated via a very effective solid heat conduction and is transmitted to the cooling liquid in heat exchanger 50. The cooling liquid, which is preferably a mixture of water and an antifreeze, flows through a supply line 52 from the outside through the plug shaft to heat exchanger 50 of cooler 12 and through a return line 54 back out of cooler 34. In this context, lines 52, 54 are guided through a flange 56, by which cooler 34, at its distal end 38 is fastened to the internal combustion engine, particularly at the cylinder head of a combustion engine. Between heat exchanger 50 and the feed-through through flange 56, supply line 52 and return line 54 are preferably executed as rigid lines.

Outside cooler 34, supply line 52 and return line 54 are continued using flexible lines 52a, 54a or line sections. This flexibility is preferably defined so that they permit plugging cooler 34 into plug shaft 12 and removing cooler 34 from plug shaft 12, without the cooling circulation having to be opened in the process.

Proximal end 36 of cooler 34 is preferably connected to flange 56 situated at its distal end 38 by a rigid pipe 58. The connection by a rigid pipe 58 has the advantage that pipe 58 is able to transmit mounting forces and torques and dismounting forces and torques. In one alternative embodiment, the pipe is made of a ductile material, such as teflon. This embodiment has the advantage of better vibrational damping compared to a rigid pipe 58.

Figure 3:
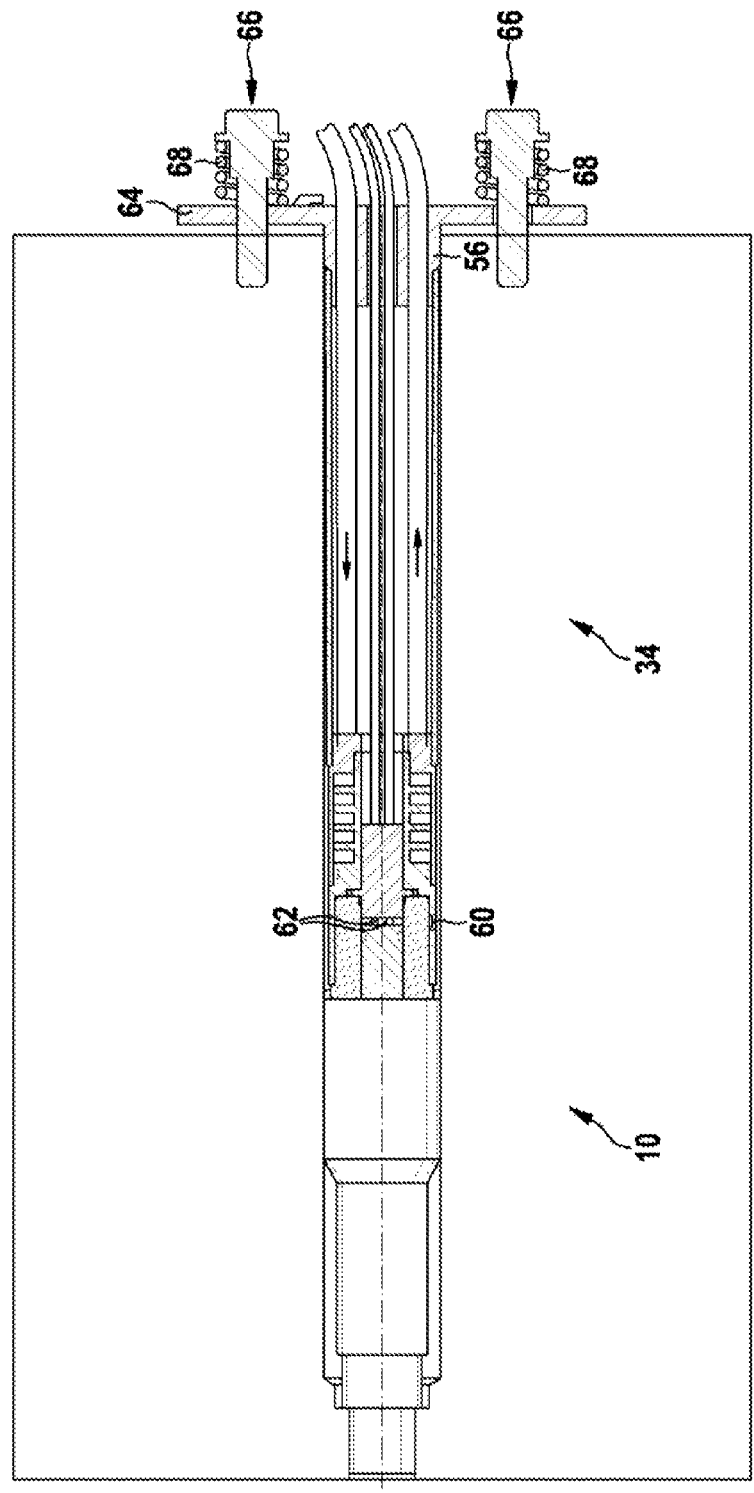
FIG. 3 shows a laser spark plug and a cooler in a state joined together to form an exemplary embodiment of a laser ignition device.

FIG. 3 shows laser spark plug 10 and cooler 34 in a state of being joined together and inserted and fastened in plug shaft 12. In order to achieve this state, laser spark plug 10 is first placed by itself, i.e. without cooler 34, into plug shaft 12 and screwed on tightly. The connecting means described up to now, be it means 24, 43 for the thermal and mechanical connection or means 30, 48 for the electrical connection, all stand out in that the connection takes place by a translational motion in the direction of the longitudinal axis of laser spark plug 10, and thus also in the direction of longitudinal axis 40 of plug shaft 12, and a disconnection takes place by a translational motion in the opposite direction. This translational motion, by contrast to, for example, a swiveling motion taking place transversely to the longitudinal axis of the laser spark plug, permits connecting and disconnecting cooler 34 in the case of a laser spark plug 10 built into plug shaft 12.

In this context, in order also to ensure the correct polarity of all the electrical connections of laser spark plug 10, a preferred embodiment provides that connecting means 30, 48 of the electrical connection, that is, the plug and socket combination has a positive locking element which permits the closing of the plug connection only if the polarity is right. Such a positive locking element is implemented, in one embodiment, by a pin 60 standing radially outwards away from laser spark plug 10, which engages with a slit in cooler 34 that corresponds when there is a correct position of cooler 34 with respect to laser spark plug 20.

In order to protect the plug connection from corrosion by corrosive media penetrating into plug shaft 12, a further preferred embodiment provides a seal 62, which lies between plug element 30 of laser spark plug 10 used for the electrical connection and the plug element of the cooler that is used for the electrical connection, and seals the inside of the closed plug connection from outer effects.

One of the two plug elements 30, 48 participating in the electrical plug connection is connected rigidly to respective component 10, 34 in the direction of the longitudinal axis of the respective component, be it laser spark plug 10 or cooler 34, and is elastically somewhat pivotable flexibly in the radial direction as well as in a pivoting cone centered about the longitudinal axis, so that a position during the connecting together of laser spark plug 10 and cooler 34 is able to match itself to the position of the respectively other plug element 49, 30. The other plug element is preferably fastened rigidly.

Flange 56, situated at distal end 38 of cooler 34 is held radially and axially, in the embodiment shown here, by a flange 64 that lies further out. In this instance, outer flange 64 engages over inner flange 56 in such a way that inner flange 56 is rotatable with respect to outer flange 64. Because of this, the angular position of the inner flange is able to be set freely with respect to a rotation about longitudinal axis 40 of plug shaft 12, whereas the angular position of the outer flange with respect to such a rotation is fixed in that it is able to be connected only in certain positions to the internal combustion engine. These certain positions are fixed, for example, in that a recess in the outer flange, through which a fastening screw 66 passes, has to lie above a tapped hole prepared to accommodate this fastening screw 66 in the internal combustion engine.

In order to compensate for different thermal expansions of plug shaft 12 and the system made up of laser spark plug 10 and cooler 34 connected to it, a further preferred embodiment provides that the fastening of said system at its distal end in the direction of longitudinal axis 40 of plug shaft 12 be flexible. One should note however that a certain contact force is required, using which cooler 34 is pressed against laser spark plug 10, in order to ensure a sufficiently good heat contact. This applies particularly for a heat contact arranged via respective end face heat contact surface 28 of laser spark plug 10 and heat contact surface 46.

In the embodiment shown in FIG. 3, such a contact force is generated by elastic elements 68, such as springs, which lie between the heads of fastening screws 66 and outer flange 64.

An alternative embodiment provides that such elastic elements should lie between outer flange 64 and inner flange 56, and would thus permit a relative motion, giving rise to elastic restoring forces, between the two flanges 56 and 64 mentioned, in the axial direction.

A further embodiment stands out by having a cooler 34 having an integrated plug and flexible hoses for the cooling means supply line and the cooling means return line. Owing to the flexible hoses, flange 56, situated at distal end 38 of cooler 34 may be twisted within certain limits with respect to proximal end 36 of cooler 34. Thereby cooler 34 may first of all be connected by a translational motion to laser spark plug 10 that is fixedly built into plug shaft 12. Thereafter, the fastening of cooler 34 to the internal combustion engine may take place by a bayonet closure, in which flange 56, then implemented correspondingly as a bayonet closure part, is then twisted a bit with respect to proximal end 38 of cooler 34. The mounting and dismounting of cooler 34, in this case, takes place with the aid of a special tool, which connects proximal end 36 of pluggable cooler 34 in plug shaft 12 to distal end 22 of laser spark plug 10, and transmits the mounting and dismounting forces and torques required for this.

If, because of vibrations of the internal combustion engine that are too great, a plug system for the required electrical contacting is not possible, it is provided, within the scope of an additional embodiment, that an electrical connecting cable be solidly mounted on laser spark plug 10. In this case, it is required that cooler 34 has a slit on its entire length into which the cable of laser spark plug 10 is laid, after the screwing in of laser spark plug 10 into the internal combustion engine and before, or rather during the plugging in of cooler 34 into plug shaft 12. In this embodiment, the plug key for screwing in laser spark plug 10 into plug shaft 12 also needs a slit.

With all this, FIG. 3 particularly shows a laser ignition device that is made up of connecting together a laser spark plug according to the present invention and a cooler, and whose method of functioning in the connected and installed state is comparable to the method of functioning of the known laser ignition device, namely, to provide laser ignition energy and to dissipate interfering heat during operation.

Figure 4:
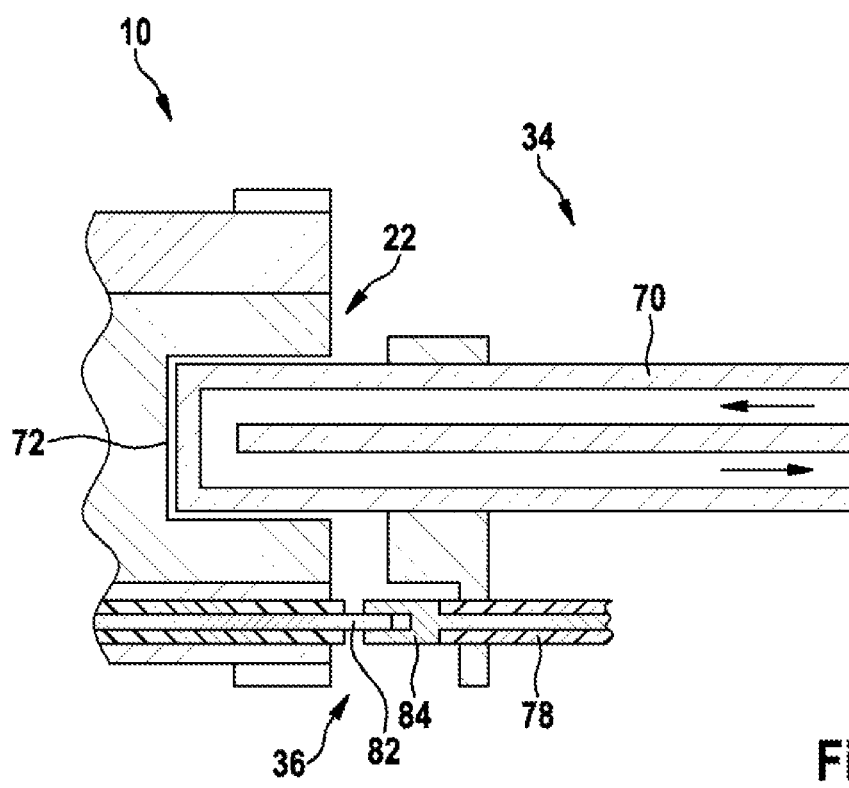
FIG. 4 shows an embodiment of the cooler.

FIG. 4 shows an embodiment in which cooler 34 has a lug 70, that has a liquid flowing through it, as means for absorbing heat from laser spark plug 10. FIG. 4 particularly shows distal end 22 of laser spark plug 10 and proximal end 36 of cooler 34 in a thermally and electrically connected state.

Lug 70, on proximal end 36 of cooler 34, engages in a recess 72 at the distal end of laser spark plug 10. In this embodiment, the inner surfaces of recess 72, that is, the side surfaces and/or the bottom surface of recess 72, form heat contact surfaces of laser spark plug 10. The outer surfaces of the lug complementary to this, that is, its side surfaces and/or its end face, form heat contact surfaces of cooler 34, to the extent they project into recess 72.

Recess 72 is preferably located in a component of laser spark plug 10 which is used as heat accumulator and heat transfer. As the material for this component, a particular possibility is a metal, preferably a metal having good heat conductivity, such as aluminum. In the embodiment shown, lug 70 is hollow and has a supply line 74 and a return line 76 for cooling liquid.

If, because of vibrations of the engine that are too great, the use of a plug system for the electrical contacting is not possible, the electrical connecting cable may here, too, be solidly mounted to laser spark plug 10, in deviation from the embodiment shown in FIG. 4. In this case, the plug key for screwing in laser spark plug 10 into plug shaft 12 also needs a slit in this embodiment.

Lug 70 preferably forms a loose fit with recess 72. In another embodiment, the pairing of recess 72 and lug 70 is constructed in such a way that a press fit results in the connected state. Especially in the case of a loose fit, it is preferred that one use a heat conducting paste in the contact vicinity of the outer surface of lug 70 and/or the inner surface of recess 72, to improve the heat transfer from laser spark plug 10 to cooler.

Distal end 22 of laser spark plug 10 has a catch profile 80 which is implemented as a claw coupling and is equipped for connection using a tool, particularly a plug key. A plug element 82, firmly connected to laser spark plug 10, in the form of a plug forms an electrical plug connection with a plug element 84, implemented as a mating connector or plug socket of cooler 34, via which a laser device of laser spark plug 10 is supplied with electrical energy and controlled. In addition, check-back signals for the operation of the laser, such as a photodiode signal, are transmitted via this connection. In case the laser device has a Peltier element for cooling the point light source, the electrical connections required for operating the Peltier element may also be closed by the plug connection. In this embodiment, the electrical plug connection is decentralized, that is, it is situated outside longitudinal axis 40 of plug shaft 12. Plug element 84, on the cooler side, is fastened to cooler 34, so that the plugging forces are transferred via cooler 34.

In one alternative embodiment for implementing lug 70 as a liquid-cooled hollow lug, lug 70 may also be realized as a massive heat-conductive rod made of solid material, particularly of a metal that conducts heat well. In such an embodiment, the other end of the heat conducting rod is preferably cooled by an heat exchanger that lies near the plug shaft opening or by an heat exchanger that lies outside the plug shaft, which preferably has cooling liquid flowing through it. This has the advantage that a large heat transition surface is able to be implemented, since more installation space volume is available outside the narrow plug shaft.

Within the scope of another alternative embodiment, lug 70 is implemented as the end of an heat exchanger tube. An heat exchanger tube is an heat transmitter which permits an high heat flow density while utilizing phase transitions running under heat absorption and heat emission. A greater cooling efficiency is achieved thereby than would be possible in response to using massive heat conducting rods. This embodiment, too, may be fastened to the internal combustion engine in the manner described in connection with FIG. 3.

Figure 5:
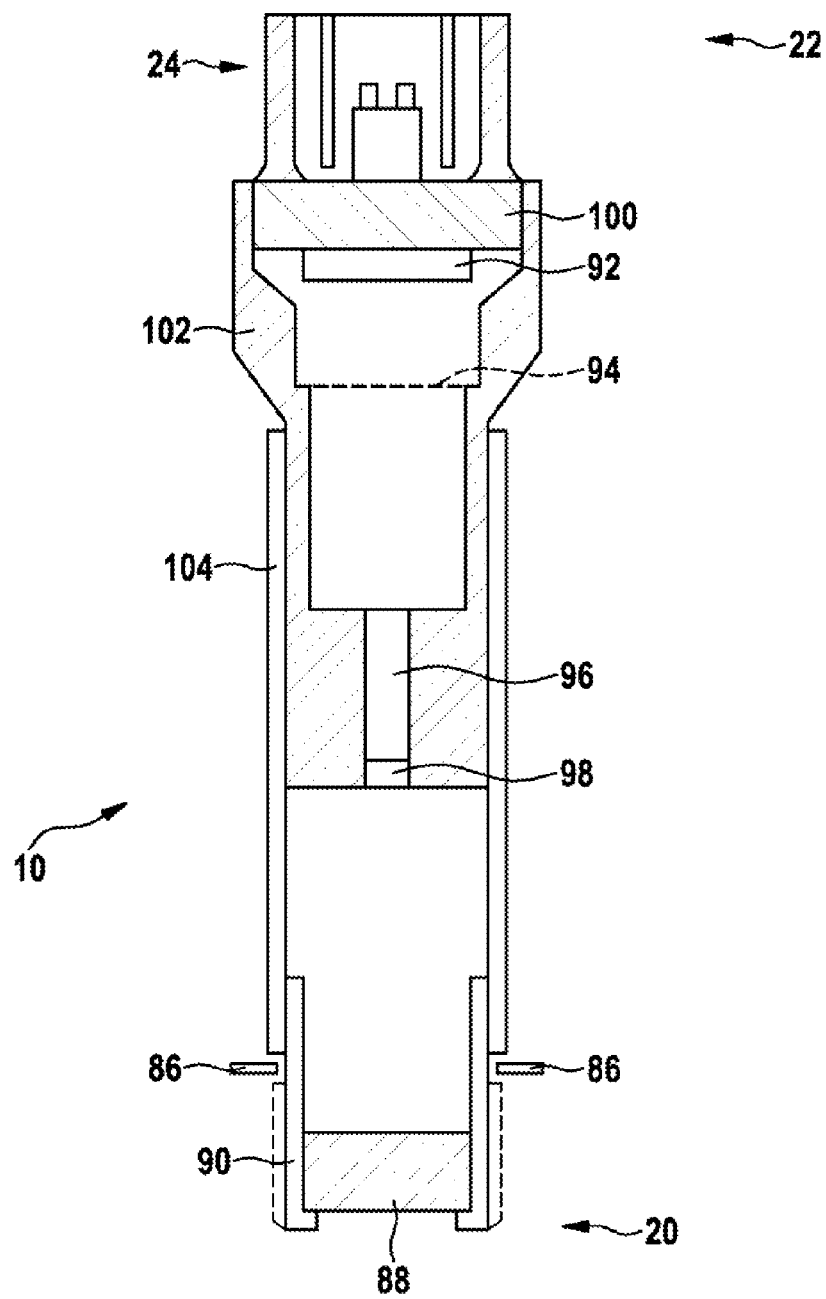
FIG. 5 shows a cross section of a laser spark plug along its longitudinal axis.

FIG. 5 shows a cross section of a laser spark plug 10 along its longitudinal axis. The laser spark plug has a proximal end 20 a distal end 22. At proximal end 20 there is an outer thread by which laser spark plug 10 is screwed into a plug thread of plug shaft 12. A seal 86 is used to seal the combustion chamber from the plug shaft. A combustion chamber window 88, that is transparent to laser light, is situated at proximal end 20 in a base part 90 of laser spark plug 10, and permits coupling out laser energy, particularly in the form of laser ignition pulses, from laser spark plug 10. To generate the laser energy, laser spark plug 10 has a laser device having a pump source 92, a focusing optics 94, an ignition laser 96 and a passive Q-switching 98.

Pump source 92 is preferably a plurality of semiconductor diode lasers. The pump lasers are developed, particularly preferred, as surface-emitting semiconductor lasers (VC-SEL, vertical cavity surface emitting laser). Alternatively or in addition, edge emitting semiconductor lasers or a combination of surface emitters and emitters may also be used. Surface emitting semiconductor lasers have the advantage over other pump lasers of having less temperature sensitivity. They are therefore particularly well suitable in connection with the present invention, because the invention implies positioning laser spark plug 10 in the depth of plug shaft 12, where little space is available for effective cooling.

The heat released during operation of pump source 92 is transmitted into an end plate 100 that is used as an heat accumulator and/or an heat transmitter. For this purpose, end plate 100 is located in thermal contact with pump source 92. In one embodiment, a Peltier element is provided in addition, for the active cooling of pump source 92. Such a Peltier element may be situated between pump source 92 and end plate 100, so that it is thermally coupled to both elements 92, 100. It may also, however, be coupled only to end plate 100. The pump radiation generated by pump source 92 is collimated by focusing optics 94 onto ignition laser 96, which is preferably a laser-active solid. A Q-switching 98 is assigned to the laser-active solid, particularly a passive Q-switching 98, so that ignition laser 96 generates high energy laser ignition pulses under the effect of pump radiation, in a manner known per se. Mirrors required for developing a laser resonator on the outer end faces of the system made up of laser-active solid 96 and Q-switching 98, as well as the optics for focusing the laser beam from the ignition laser in the combustion chamber are not illustrated in FIG. 5.

End plate 100 situated at the distal end 22 of the laser spark plug has connecting means 24 on its side facing away from pump source 92 for the detachable mechanical and thermal connection to the cooler. The laser device is preferably situated in a headpiece 102 of laser spark plug 10, while combustion chamber window 88 is integrated into a separate base part 90. Headpiece 102 and base part 90 in the embodiment shown are connected to each other by a tube-shaped intermediate piece 104. The connection of tube-shaped intermediate piece 104 to headpiece 102 and to base part 90 preferably takes place by connection in continuous material such as welding seams, but other types of connection are also conceivable, such as a screw joint and/or crimping, combined with elastomeric sealing elements.

In one preferred embodiment, intermediate piece 102 stands out in that it uncouples base part 90 thermally to the greatest extent possible from headpiece 102. Thereby an undesired heat flow from proximal (hot) end 20 to temperature-sensitive pump source 92 is reduced or held to a low level. It is therefore preferred that intermediate piece 104 be implemented as a poor heat conductor. This may, for instance, be realized in that intermediate piece 104 is a stainless steel tube, especially a stainless steel tube having a small wall thickness, or that it is made of a poorly heat conducting ceramic.

FIG. 6 shows an additional exemplary embodiment of a system made of a laser plug 10 and a cooler 34, that is able to be separated from the laser spark plug 10. In this context, the separating line between the laser spark plug and cooler 34 runs along dashed line 106. In the assembly of the system, laser 10 is first screwed into the opening of the combustion chamber to the plug shaft. Cooler 34 is then plugged onto it. Cooler 34, in particular, has an heat exchanger 108, which is produced from several parts, if necessary. Cooling means flow through a flexible hose 110, via a connection 112, into heat exchanger 108. At that point, the cooling means absorb heat which, via solid heat line, is given off from laser plug 10 in contact region 116, which is made up by a pairing of heat contact surfaces of laser spark plug 10 and heat exchanger 108. Contact region 116 may be cylindrical or conical. The conical shape is particularly advantageous, since an especially good contact is achieved thereby. Heat exchanger 108 is pressed, using a cap nut 118 having a thread 120, axially against means 24, that are conical at this location, of laser spark plug 10 for thermal coupling, and are held on laser plug 10. As the drive, one may use cutouts 118a, into which a claw key may be plugged to tighten cap nut 118. Cutouts 118a preferably have the same dimensions as cutouts 122, that are used to drive laser spark plug 10, on laser spark plug 10, so that the same key may be used.

Alternatively to the screw joint, the cooler may also be held to the laser plug by a bayonet closure. In this case, the plug key is used for rotating the bayonet closure about the angle required for locking. A further alternative for the mounting is latching by spring-loaded latches which reach into an undercut. In this case, a special tool which is advantageously integrated into the plug key, may be used to unlock the latching.

In the center of heat exchanger 108 there is an electrical plug element 124, which fits onto a plug element 126 of laser plug 10. Plug elements 124, 126 have codings so that they cannot be plugged in at reverse polarity. Alternatively, the coding may also take place between the more robust metallic elements 24 and 108, for instance using a pin and a slit. Electric lines 11 and cooling means hoses 110 are guided from the plug shaft in a cable bundle. This is protected at the transition to the heat exchanger by a strain relief device.

With all this, FIG. 6, similar to FIG. 3, particularly shows a laser ignition device that is made up of connecting together a laser spark plug 10, according to the present invention, and a cooler 34, and whose method of functioning in the connected and installed state is comparable to the method of functioning of the known laser ignition device, namely, to provide laser ignition energy and to dissipate interfering heat during operation.

Furthermore, FIG. 6 shows thereby a cooler for a laser spark plug, that has a proximal end arranged for the detachable mechanical and thermal connection to the laser spark plug, which allows the connection, taking place within the plug shaft, of the cooler to the laser spark plug and the disconnecting of the cooler from the laser spark plug. In this context, the proximal end of the cooler is equipped to be screwed together with the distal end of the laser spark plug.

One great advantage of the embodiment shown in FIG. 6 compared to the embodiments shown in the remaining figures of coolers 34 is that the length of the cooler does not have to be coordinated with the depth of the plug shaft. This embodiment may therefore be used universally.

All the embodiments, that is, both the embodiment as in FIG. 6 and the embodiments having coolers which are not fastened or not only fastened on the laser spark plug, but also on, or only on the opening of the plug shaft, additionally have the advantage of universal applicability of laser spark plug 10 for internal combustion engines having different plug shaft depths. The different plug shaft depths of different internal combustion engines may be compensated for by different lengths of coolers 34, as a result of the modular design of a laser ignition device from a laser spark plug module and a cooler module, the same laser ignition modules being able to be used in each case. This increases the proportion of interchangeable components and simplifies the stockkeeping of spare parts.

As was pointed out above, the laser spark plug according to the present invention and the cooler according to the present invention form a laser ignition device in the connected state, whose manner of functioning in the built-in state is comparable to the manner of functioning of the known laser ignition device, namely, to provide laser ignition energy and to dissipate interfering heat during operation. Advantages over the known laser ignition device implemented as one component are yielded by the modular design of the laser ignition device provided in this Application. A laser ignition device joined together from a laser spark plug provided in this Application and a cooler provided in this Application as modules separable from each other is also regarded as novel and inventive. This also applies to each combination of embodiments of laser spark plugs and coolers provided in this Application.

What is claimed is:

1. A laser spark plug configured to be installed in a plug shaft of an internal combustion engine and to focus laser ignition energy into a combustion chamber of the internal combustion engine via a proximal end of the laser spark plug on a combustion chamber-side, the internal combustion engine having a cooler, the laser spark plug comprising:
   a laser device; and
   a first connecting unit positioned at a distal end of the laser spark plug opposite to the proximal end, wherein the first connecting unit is configured for detachable mechanical and thermal connection to the cooler, the first connecting unit being configured to provide selective connecting and disconnecting of the cooler when the laser spark plug is installed in the plug shaft, wherein at least one of the following is satisfied: (i) a first thermal contact surface is situated radially outside the first connecting unit, and (ii) a second metallic thermal contact surface is situated on an end face of the first connecting unit; and (iii) a third thermal contact surface is situated radially inside on the first connecting unit;
   a second connecting unit positioned at the distal end of the laser spark plug for detachable electrical connection of the laser spark plug;
   wherein the second connecting unit is (i) situated at a central location of the distal end and (ii) configured as one of a plug or a socket of an electrical plug connection,
   wherein the second connecting unit is configured to (i) close the electrical plug connection by a first translational motion taking place in the direction of a longitudinal axis of the laser spark plug and (ii) separate the electrical plug connection by a second translational motion directed in an opposite direction of the first translational motion, and
   wherein the second connecting unit has a positive locking element which permits a closing of the plug connection only at a specified correct polarity, and wherein the positive locking element includes a pin, which stands radially outwards away from the laser spark plug and which engages with a slit in the cooler.

2. The laser spark plug as recited in claim 1, wherein:
the laser device has an ignition laser and a pump source; and
the laser spark plug has a length in which the distal end, in the installed state, is at a distance from a sealing seat in the plug shaft which is less than 230 mm and greater than 80 mm.

3. The laser spark plug as recited in claim 2, wherein a greatest diameter of the laser spark plug is less than 50 mm.

4. The laser spark plug as recited in claim 2, further comprising:
an electrical connecting cable which is connected to the laser plug.

5. The laser spark plug as recited in claim 1, wherein the metallic heat contact surface is situated at the distal end of the laser spark plug, at least one of cylindrically outwards and at the distal end face.

6. The laser spark plug as recited in claim 1, wherein the metallic heat contact surface is implemented at the distal end of the laser spark plug, as at least one of (i) a surface of a recess lying centrally inside and (ii) an end face of the distal end.

7. The laser spark plug as recited in claim 1, wherein: the laser device is situated at the distal end of the laser spark plug; and the proximal end and the distal end of the laser spark plug are connected to each other by an intermediate piece which conducts heat less than the distal end of the laser spark plug.

8. The laser spark plug as recited in claim 7, wherein the intermediate piece is a stainless steel tube.

9. The laser spark plug as recited in claim 1, wherein the first connecting unit has at least one catch profile, wherein the catch profile permits a tightening of a screw joint of the laser spark plug with a tapped hole at the proximal end of the plug shaft, by a tool fitting the respective catch profile.

* * * * *